US006235338B1

(12) United States Patent
Gallant et al.

(10) Patent No.: US 6,235,338 B1
(45) Date of Patent: *May 22, 2001

(54) METHODS FOR RECOVERING RAW MEAT FROM THE HEAD-SHELLS OF CRUSTACEANS, E.G. LOBSTERS AND USE THEREOF FOR STUFFED CRUSTACEANS, E.G. LOBSTER AND STUFFING SO-PROVIDED

(76) Inventors: Cyril G. Gallant, RR #2, Souris, Prince Edward Island (CA), C0A 2B0; Lily Hong, 148 Maypoint Road Apt. 11, Charlottetown, Prince Edward Island (CA), C1E 1V1; Richard Ablett, Suffolk, RR #3, Charlottetown, Prince Edward Island (CA), C1A 7J7

( * ) Notice: Subject to any disclaimer, the term of this patent is extended or adjusted under 35 U.S.C. 154(b) by 0 days.

This patent is subject to a terminal disclaimer.

(21) Appl. No.: 09/354,585

(22) Filed: Jul. 16, 1999

(30) Foreign Application Priority Data

Jul. 20, 1998 (CA) .................................................. 2240079

(51) Int. Cl.⁷ ..................................................... A23L 1/325
(52) U.S. Cl. .................................. 426/643; 542/1; 542/8; 426/56; 426/92; 426/480
(58) Field of Search ............................... 426/643, 56, 90, 426/92, 480; 452/1–11

(56) References Cited

U.S. PATENT DOCUMENTS

| 2,155,308 | 4/1939 | Harris | 99/188 |
|---|---|---|---|
| 2,501,655 | 3/1950 | Altenburg | 99/195 |
| 2,858,223 | 10/1958 | Harris | 426/479 |
| 2,978,334 | 4/1961 | Lapeyre | 426/479 |
| 3,471,894 | * 10/1969 | Tasker . | |
| 3,513,071 | 5/1970 | Fehmerling | 195/2 |
| 3,705,040 | 12/1972 | Bynagte | 99/111 |
| 3,773,962 | 11/1973 | Trelease et al. | 99/175 |
| 4,053,964 | * 10/1977 | Rutldge | 17/48 |
| 4,054,970 | * 10/1977 | Metzger | 17/71 |
| 4,158,249 | * 6/1979 | Jasniewicz | 17/71 |
| 4,222,153 | * 9/1980 | Schmidt | 17/73 |
| 4,236,277 | * 12/1980 | Rudy | 17/73 |
| 4,286,356 | * 9/1981 | Wenstrom | 17/46 |
| 4,387,485 | * 6/1983 | Grinberg | 17/48 |
| 4,523,349 | * 6/1985 | Warren | 17/46 |
| 4,588,601 | 5/1986 | Maruyama et al. | 426/574 |
| 4,816,278 | 3/1989 | Sasamoto et al. | 426/513 |
| 4,820,529 | 4/1989 | Uchida et al. | 426/7 |
| 5,401,207 | * 3/1995 | Hicks | 452/1 |
| 5,405,287 | * 4/1995 | Allain | 452/4 |
| 5,560,954 | 10/1996 | Elbaz | 426/589 |
| 5,839,952 | * 11/1998 | Pollingue | 452/8 |

\* cited by examiner

*Primary Examiner*—Carolyn Paden
(74) *Attorney, Agent, or Firm*—Nath & Associates PLLC; Gary M. Nath; Jerald L. Meyer

(57) ABSTRACT

Procedures are provided herein for the optimization of the utilization of crustaceans, e.g., whole lobsters, through the inclusion of under-utilized components. The procedure involves firstly, initiating the detachment of the raw edible deep-shoulder myotomal meat from deep-shoulder cartilaginous skeleton attachment. This may be accomplished either by immersing the head-shell in a solution of protease enzymes, or subjecting the head-shell to at least one freeze-thaw cycle. Then, the so-treated head-shell is subjected to vacuum aspiration to remove, and to recover, the raw meat fraction. Procedures are further-described for the utilization of such recovered raw meat fraction, e.g., to provide stuffing and to provide stuffed crustaceans, e.g., lobsters.

52 Claims, 5 Drawing Sheets

STEP (3)

STEP (4)

STEP (5)

STEP (1)

STEP (2)

STEP (3)

STEP (4)

STEP (5)

METHODS FOR RECOVERING RAW MEAT FROM THE HEAD-SHELLS OF CRUSTACEANS, E.G. LOBSTERS AND USE THEREOF FOR STUFFED CRUSTACEANS, E.G. LOBSTER AND STUFFING SO-PROVIDED

BACKGROUND OF THE INVENTION

1. Field of the Invention

The present invention relates to a method for optimizing the utilization of crustaceans, e.g., whole lobsters through inclusion of under-utilized by-product components, which in combination with the intact lobster, provides for an enhancement of intrinsic appearance and edible proportion of the intact lobster. Particularly, this method has application among clawed lobsters of the Homaridae family, the clawless Spiny lobster and Rock lobster species of temperate and tropical origin and including species of the genera Panulirus, Jasus and Chelonectes. The method can also be applied to crab, and to lobster-like crustaceans, including some types of prawn, *Nephrops norwegicus* and freshwater crayfish species.

2. Description of the Prior Art

A traditional method for processing and packaging clawed lobsters of the Homaridae family consisted of cooking them whole, either by steam exposure or by hot water immersion, cooling the product and sealing them in plastic bags containing brine solution with subsequent freezing to render the lobster embedded in ice. Inherent to this traditional lobster frozen-in-brine product, a substantial degree of visceral staining of the edible meat components within the upper tail region was encountered. This was attributed, in part, to migration and rupture of the visceral hepatopancreatic fraction and intestinal tract contents during the preparative cooking procedure. Also inherent to this product were residual heavy-metal contaminants, which were predominately-located in the visceral fraction and which underwent migration to the edible body meat fraction as a result of cooking procedures. Thereby, the relative concentration of residual heavy-metal contaminants was enhanced in the edible meat fractions of the processed product.

Other traditional methods of processing intact lobsters consisted of freezing cooked lobsters, which were wrapped individually in wax paper in a master-box. Another common method involved the removal of the intact tail section of lobsters with subsequent individual quick-freezing, and packaging the tails through alignment into a box. In such products, the raw lobster material either in an intact form, or as tail sections was prone to problems of breakage due to the brittle nature of their shell material. Particularly, such problems were encountered during distribution and transportation procedures.

The extraction of meat from the body of hard-shelled crustaceans, e.g., crab, crayfish, lobster, and rock shrimp, as opposed to soft-shelled crustaceans, e.g., all shrimp species, other than rock shrimp, has proved to be very difficult, time consuming and expensive. Present day practices for obtaining the edible portions from such crustaceans, e.g., lobster, crab, crayfish and the like, involved a variety of mechanical, electrical and heat-treatments, which included subjecting the crustacea to a sawing action on the shells, a high or low electrical voltage through the shells, treatment with direct flame, immersion in boiling water or various chemical treatments, treatment with steam at atmospheric pressure or under high pressures in closed vessels. A myriad of other procedures were known which involved combinations of some or all of the foregoing methods. While some of the procedures may have experienced various degrees of success, most of the prior known procedures required hand labour to treat the individual fresh crustacea in order to remove the edible flesh.

Both raw and cooked hard-shell sections of processed lobsters have heretofore been subjected to many treating methods, for example, freezing intact for subsequent transformation by boiling for rendering extraction of flavour, or proteinaceous solubles and non-soluble components for further culinary applications. In addition, the head-shell material of either raw or cooked lobster was subjected to grinding reduction and mechanical meat removal procedures.

Various mechanical methods have been developed to remove either raw or cooked meat from mechanically-reduced head-shell material. In some techniques, physical separation of the meat from the shell was effected through the use of riffle tank particle separation methods. The shell effectively settled to the bottom, and the extracted meat was concentrated by water fluming and screen collection. A recognized impediment to this procedure was the loss of desirable and delicate flavour components attributed to the extensive washing procedures during separation.

In other traditional procedures, the cooked head-shells of lobster were subjected to mechanical grinding and reduction through use of perforated rotating drum technology. In this method, the edible meat, and visceral components contained within the head-shell component was separated from the shell fraction by the application of variable belt pressure against a perforated stainless steel drum. The size of the apertures in the drum provided for physical separation of the softer meat and visceral components from the hard brittle shell and cartilaginous skeletal material. Such products which were produced thereby were commonly recognized as "lobster mince" and found use as culinary ingredients within the food industry.

Many of the difficulties of removal of the meat stemmed from the physical structure of the hard crustacean shell, the manner in which the meat was stuck to the shell, the need to extract and maintain the meat in a minimum bacteriological manner, as well as the commercial desire to extract the meat in lump form rather than in many small pieces. The research, both by industry and universities, has been extensive and has resulted in various alleged improvements in the meat extraction processes.

Pre-treatment of the crustaceans by chemicals, the use of certain cooking conditions, the use of machines which squeezed the meat out, or which cored and centrifuged the meat out, or which air or water blasted the meat out, or which froze and exploded the meat out have been proposed and advanced with varying degrees of success.

Lobster, and limbs and claws thereof, have been efficiently used and formulated into limb-like or stick-like meat products or claw meat products. After removing the carapaces, gonads, branchiae and internals, the trunks were washed with water and ground-up. Then, the meat remaining in the trunks was recovered with a meat separator and was formulated into minced meat. This meat was further washed with water and the fibrous meat was taken therefrom and was formulated into flakes. Thus, various proteineous parts, which were mostly unutilized, including meat remaining in the carapace, the glands, branchiae and meat remaining in the trunks were not utilized, but was disposed of as such.

There are many patents which are directed to the processing of such crustaceans. Non-limiting examples include the following patents:

Sterling G. Harris, in U.S. Pat. No. 2,155,308, patented Apr. 18, 1939, and assigned to The Blue Channel Corporation, provided a procedure for canning crabs, which involved a preliminary heat-treatment in an aqueous fluid.

U.S. Pat. No. 2,501,655, patented Mar. 28, 1950 by W. M. Altenburg, disclosed a method for loosening lobster meat from its shell by heating the surface of the lobster meat adjacent to the shell (by boiling), and subsequently freezing the whole lobster.

U.S. Pat. No. 2,858,223, patented Oct. 28, 1958, by Sterling G. Harris, and assigned to The Blue Channel Corporation, provided a method for separating meat from crustacean shells, in which the meat was cooked and the shell was then impacted to release the meat.

U.S. Pat. No. 2,978,334, patented Apr. 4, 1961, by Lapeyre, and assigned to The Peelers Company, described a general procedure for extracting edible portions of crustaceans, e.g., lobsters, crabs, etc., from the skeletal portions thereof. This included the sequence of freezing and subjecting the frozen skeletal portions to vacuum, in order to effect a preliminary separation of the meat from the shell, and then removing the meat manually.

U.S. Pat. No. 3,513,071 patented May 19, 1970, by Gottlieb Bernhard Fehmerling, provided a method for the treatment of crustaceans, e.g., lobsters, crabs, etc. This included the use of a synergistic combination of enzymes that attacked the connective tissue which held the edible flesh to the shell.

Japanese Patent Number 46-10898, described a method wherein lobsters subjected to vacuum chamber conditions were exposed to protease enzymes in a temperature range of about 50° C. to about 55° C. for a period of time. By first vacuum eviscerating the crustaceans with subsequent release of vacuum and injection of steam, the raw meat which was attached to the shell of the lobster could more effectively be separated and be manually-removed.

U.S. Pat. No. 3,705,040, patented Dec. 5, 1972, by Peter W. Bynagte, and assigned to Westgate-California Foods, Inc., provided a procedure for extracting meat from crustaceans by dipping them in a particular pyrophosphate metaphosphate solution.

U.S. Pat. No. 3,773,962, patented Nov. 20, 1973, by Trelease et al, and assigned to A. Swift & Company, disclosed a method which included cleaning of the stomach and hind-gut of lobster by the use of vacuum to remove the contents of the stomach and visceral cavity.

U.S. Pat. No. 4,053,694, patented Oct. 18, 1977, by James E. Rutledge, provided a procedure for pre-treating hard-shelled crustaceans, e.g., lobsters, crabs, etc., to facilitate the removal of uncooked meat therefrom. This included the steps of freezing, and then thawing and extracting the uncooked meat from the shell by conventional manual, mechanical or centrifugal procedures.

U.S. Pat. No. 4,340,613, patented Jul. 20, 1982, by Michael P. Moore, described a method for cooking crustaceans, e.g., lobsters, crabs, shrimp, etc. This method included steam cooking with subsequent application of vacuum to extract the moisture from within the shell.

Other patents taught the production of seafood pastes. Non-limiting examples include the following:

U.S. Pat. No. 4,588,601, patented May 13, 1986, by T. Maruyama et al, and assigned to Kibun Company Limited, provided a method of producing a paste-product, from, e.g., various fish to provide pseudo lobster meat. This included dividing a fine-paste product, which had already been coagulated by heating, mixing the divided product with a protein mixture and then moulding the resulting mixture. The mixing and/or moulding procedure was carried out under reduced pressure and then the moulded product was heated.

U.S. Pat. No. 4,816,278, patented Mar. 28, 1989, by Sasamoto et al, and assigned to The Japanese Research and Development Association for Extrusion Cooking, Nippon Suisan Kabushiki Kaisha, Taiyo Fishery Co. Ltd., Kabushiki Kaisha Kobe Seikosho, Ajikan Co. Ltd., and Kogyo Co. Ltd., provided a method for processing and treating raw crustaceans, e.g., lobsters, crabs, mollusks and seaweed mixtures. This material was mixed together and an optional additive, e.g., soy protein, wheat flour or starch, which was added to the mixture by means of a twin-screw extruder.

U.S. Pat. No. 4,820,529, patented Apr. 11, 1989, by Y. Uchida et al, and assigned to Asahi Denka Kogyo Kabushiki Kaisha, provided a procedure for efficiently-utilizing the meat of crustaceans, e.g., lobster, or crab. This involved utilizing the meat remaining in the trunks and carapaces, by boiling and milling the crustaceans under sufficient conditions for inactivating the enzymes contained therein. Then, added proteolytic enzymes and/or microorganisms were allowed to act thereon.

U.S. Pat. No. 5,560,954, issued Oct. 1, 1996, to Gabriel Elbaz, described a method for preparing a culinary base product from the head-shell of lobster and other crustacean species. This involved a combination of oven heating the intact head-shell material, then subjecting it to mechanical-size-reduction with subsequent emulsification and addition of thickening agents for product stabilization. For the final product, this method provided for the use of both the carapace shell and the soft tissue components.

Thus, none of the conventional methods described above provided a procedure which combined the by-products and the inefficiently-utilized components of crustaceans, e.g., lobster processing into a procedure, which enhanced the convenience of the intact product and overcame the limitations of the prior art.

SUMMARY OF THE INVENTION

Aims of the Invention

One object of the present invention is to provide for a novel crustaceans processing procedure, which maximizes the use and presentation of formerly-unutilized body parts thereof.

A second object of this invention is to provide a procedure which includes a technique which facilitates the loosening and the removal of the edible flesh from crustaceans.

A third object of another aspect of this invention is to provide a procedure which includes a technique for extracting meat from crustaceans, particularly lobster, crab, etc.

A fourth object of this invention is to provide a procedure which includes a technique for extracting meat from crustaceans, particularly lobster, crab, etc., that has a shorter processing time, is more economical, and that removes the meat in a substantially-whole form.

A fifth object of this invention is to provide a procedure which includes a technique which substantially-eliminates the need for an excess of manual operations.

A sixth object of this invention is to provide a procedure which includes a technique which attacks and at least partially-dissolves or weakens the connective tissue between the shells of crustaceans and the edible flesh.

A seventh object of this invention is to provide a procedure which includes a technique of producing a paste-product from lobster roe and lobster meat.

An eighth object of this invention is to provide a procedure which includes a technique which provides an improved method of preparing a whole, cooked, stuffed and frozen lobster product.

A ninth object of this invention is to provide a procedure which includes a technique for a process for the removal of the uncooked meat from hard-shelled crustaceans.

Statement of Invention

This invention provides a method for removing raw meat from the head-shell of a crustacean, which comprises initiating the detachment of the raw edible deep-shoulder myotomal meat from deep-shoulder cartilaginous skeleton attachment by the step of, either immersing the head-shell in a solution of protease enzymes, or subjecting the head-shell to at least one freeze-thaw cycle, and subjecting the so-treated head-shell to vacuum aspiration to remove and to recover the raw meat fraction in lump form.

The present invention provides a second method, namely for preparing stuffed, intact, whole, lobster, which comprises vacuum eviscerating the anterior and posterior sections of the lobster, back flushing the anterior and posterior sections of the lobster for the removal of the visceral and intestinal contents of the lobster, and filling the anterior visceral cavity of the lobster with a stuffing comprising a raw blend comprising female lobster roe and deep-shoulder section myotomal meat which has been extracted from the head-shell of a lobster, or from other lobsters, thereby providing stuffed, intact, whole, lobster.

This invention also provides a stuffed, intact, whole, lobster in which the visceral and intestinal contents of the lobster have been removed, the lobster being filled with a filling comprising a raw blend comprising female lobster roe and deep-shoulder myotomal meat from another lobster or from other lobsters.

This invention also provides a stuffing comprising a raw blend of female lobster roe and deep-shoulder myotomal meat from another lobster or from other lobsters.

Other Features of the Invention

By one feature of this first broad method of this invention, the raw head-shell is immersed into an aqueous solution of a protease enzyme in the concentration of about 15 to about 55 (w/w) under temperature conditions ranging between about 15° C. and about 40° C. for a period of between about 2 minutes and about 8 minutes and in a pH range of about 5.0 to about 8.0, thereby to provide rapid release of intact deep-shoulder myotomal meat for cartilaginous skeletal attachments. By a first additional feature thereof, the method includes the steps of terminating the action of the protease enzyme by immersion of the head-shell in hot water which is held at a temperature of between about 80° C. and about 100° C. for a period of between about 10 seconds and about 75 seconds, and subsequently subjecting the head-shell to conditions of cold water immersion in a temperature range of between about 1° C. and about 10° C. for a period of between about 1 minute and about 5 minutes. By a second additional feature thereof, the method includes the step of vacuum aspiration of the so-treated deep-shoulder myotomal meat under about 15 inches of Hg. to about 25 inches of Hg.

By a second feature of this first broad method of this invention, the head-shell is subjected to a freezing procedure at a temperature ranging between about −10° C. and about −20° C., followed by thawing of the frozen head-shell until a temperature of between about 4° C. and about 12° C. is reached. By one additional feature thereof, the thawed head-shell is subjected to conditions of cold water immersion in a temperature range of between about 1° C. and about 10° C. for a period of between about 1 minute and about 5 minutes. By a second additional feature thereof, the method includes the step of vacuum aspiration of the so-treated deep-shoulder myotomal meat under about 15 inches of Hg. to about 25 inches of Hg.

By a first feature of this second method of this invention, the method includes the step of subsequently freezing the stuffed, intact, whole, lobster.

By a second feature of this second method of this invention, and/or the above features thereof, the method includes the step of cooking the stuffed, intact, whole, lobster at about 100° C. for a sufficient time to achieve internal carapace temperature of at least about 75° C., followed by subsequent rapid-cooling to effect rapid temperature removal, and finally freezing the stuffed, intact, whole, lobster. By a first additional feature thereof, the cooking of the stuffed, intact, whole, lobster is by steam cooking. By a second additional feature thereof, the cooling of the cooked stuffed, intact, whole, lobster is by spray irrigation.

By a third feature of this second method of this invention, and/or the above features thereof, the claws, legs, dorsal shell-plate and visceral contents have been removed from another lobster, and the deep-shoulder myotomal meat is dislocated from attachment to cartilaginous appendages by means of a protease enzyme. By a first additional feature thereof, the raw head-shell, so-obtained, is immersed in an aqueous solution of the protease enzyme of between about 1 and about 5 (w/w) for a period of between about 2 minutes to about 8 minutes in a pH range of between about 5.0 and about 8.0 and at a temperature range of between about 15° C. and about 45° C. By a second additional feature thereof, the method includes the step of exposing the treated head-shell to water at a temperature of between about 80° C. and about 100° C. for between about 10 seconds and about 75 seconds, to effect termination of continuing protease enzyme activity. By a third additional feature thereof, the method includes the step of exposing the treated head-shell material to cold water in the temperature range of about 1° C. to about 10° C. for a period of between about 3 minutes to about 8 minutes, to effect heat-removal from the head-shell material. By a fourth additional feature thereof, the method includes the step of vacuum aspiration of the loosened deep-shoulder myotomal meat from the deepshoulder section of the treated head-shell material in the range of about 15 inches of Hg. to about 25 inches of Hg., thereby to provide the deep-shoulder myotomal meat for the stuffing described above.

By a fourth feature of this second method of this invention, and/or the above features thereof, the raw blend comprising female lobster roe and deep-shoulder myotomal meat from the head-shell of a lobster, is prepared by the step of blending deep-shoulder myotomal meat with roe, which has been manually-removed from gravid female lobster. By a first additional feature thereof, the proportions of the female lobster roe and deep-shoulder myotomal meat is in the range of between about 10% and about 50% by weight of the female lobster roe, and correspondingly between about 90% and about 50% by weight of the deep-shoulder myotomal meat. By a second variation thereof, the blending is carried out in a food processor. By a third additional feature thereof, the method includes the step of blending therein from about 1% by weight to about 10% by weight of a food grade starch, thereby to ensure freeze-thaw stability and performance of the cooked blended stuffing.

By a fifth feature of this second method of this invention, and/or the above features thereof, the raw blend comprising female lobster roe and deep-shoulder myotomal meat from the head-shell of a lobster is introduced into the anterior visceral cavity of the previously-eviscerated lobster, by oral intubation and subsequent vibration to effect removal of residual air, thereby to achieve effective filling of the anterior visceral cavity, effecting integuous contact between the stuffing blend and the contour of the inner shell surface and region of abutment of the internal and anterior abdominal facets of the tail meat of the previously-eviscerated lobster.

By a sixth feature of this second method of this invention, and/or the above features thereof, the stuffing is steam-cooked until an internal temperature of between about 75° C. and about 85° C. is obtained, thereby to confer a mousse-like texture and a desirable pink coloration to the stuffing blend.

By an seventh feature of this second method of this invention, and/or the above features thereof, the steam-cooked stuffed lobster is subsequently cooled by spray irrigation to the dorsal surface of the lobster, thereby to effect rapid cooling to avoid overcooking, and thereby to maintain high quality and integrity to the lobster meat and to the stuffing.

By a eighth feature of this second method of this invention, and/or the above features thereof, the vacuum aspiration of the anterior visceral cavity and the posterior intestinal tract is accompanied by back-flushing with a dilute aqueous solution of lactic acid, thereby to confer a bacteriostatic property to the eviscerated lobster. By a first additional feature thereof, the lactic acid is used in a concentration range of about 5 ml/L to about 20 ml/L (w/w).

By a ninth feature of this second method of this invention, and/or the above features thereof, the raw head-shell is immersed into an aqueous solution of a protease enzyme in the concentration of about 15 to about 55 (w/w) under temperature conditions ranging between about 15° C. and about 40° C. for a period of between about 2 minutes and about 8 minutes and in a pH range of about 5.0 to about 8.0, thereby to provide rapid release of intact deep-shoulder myotomal meat from cartilaginous skeletal attachments. By a first additional feature thereof, the method includes the steps of terminating the action of the protease enzyme by immersion of the head-shell in hot water which is held at a temperature of between about 80° C. and about 100° C. for a period of between about 10 seconds and about 75 seconds, and subsequently subjecting the head-shell to conditions of cold water immersion in a temperature range of between about 1° C. and about 10° C. for a period of between about 1 minute and about 5 minutes. By a second additional feature thereof, the method includes the step of vacuum aspiration of the so-treated deep-shoulder myotomal meat under about 15 inches of Hg. to about 25 inches of Hg.

By one feature of the lobster embodiment of this invention, the stuffed, intact, whole, lobster is in the form of frozen stuffed, intact, whole, lobster.

By a second feature of the lobster embodiment of this invention, and/or the above feature thereof, the stuffed, intact, whole, lobster is in the form of initially-cooked, such stuffed, intact, whole, lobster which has been cooked at about 100° C. for a sufficient time to achieve an internal carapace temperature of at least about 75° C. By a first additional feature thereof, the stuffed, intact, whole, lobster is in the form of a lobster which has been rapidly-cooled to effect rapid temperature removal, and finally which has been frozen.

By a third feature of the lobster embodiment of this invention, and/or the above features thereof, the stuffed, intact, whole, lobster is form of steam-cooked stuffed, intact, whole, lobster. By one additional feature thereof, the stuffed, intact, whole, lobster in the form of steam-cooked and spray-irrigated-cooled such stuffed, intact, whole, lobster.

By a fourth feature of the lobster embodiment of this invention, and/or the above features thereof, the stuffed, intact, whole, lobster is one in which the stuffing comprises female lobster roe which has been manually-removed from gravid female lobster and deep-shoulder myotomal meat which has been extracted which has been extracted from other lobsters. By a first additional feature thereof, the proportions of the female lobster roe and the deep-shoulder myotomal meat are in the range of between about 10% and about 50% by weight of the female lobster roe, and between about 60% and about 90% by weight of the deep-shoulder myotomal meat. By a second additional feature thereof, freeze-thaw stability and performance of the cooked, blended stuffing is ensured by providing the stuffing as a blend which also contains from about 1% by weight to about 10% by weight of a food grade starch.

By a fifth feature of the lobster embodiment of this invention, and/or the above features thereof, the effective filling of the anterior visceral cavity is ensured to effect integuous-contact between the stuffing and the contour of the inner-shell surface and the region of abutment of the internal and anterior abdominal facets of the tail meat of the lobster, by having the stuffing introduced into the anterior visceral cavity of a previously-eviscerated lobster by oral intubation and subsequent vibration to effect removal of residual air.

By a sixth feature of the lobster embodiment of this invention, and/or the above features thereof, the stuffing is in the form of a mousse-like texture and a desirable pink coloration, by having the stuffing steam-cooked until an internal temperature of between about 75° C. and about 85° C. is obtained.

By a seventh feature of the lobster embodiment of this invention, and/or the above features thereof, the stuffed, intact, whole, lobster is in the form in which overcooking is avoided and thereby in which high-quality and integrity to the lobster meat and to the stuffing is maintained, by having the steam-cooked stuffed lobster subsequently-cooled by spray irrigation to the dorsal surface of the lobster.

By an eighth feature of the lobster embodiment of this invention, and/or the above features thereof, the stuffed, intact, whole, lobster is in the form in which a bacteriostatic property has been conferred to the eviscerated lobster, by accompanying the vacuum aspiration of the anterior visceral cavity and the posterior intestinal tract by back-flushing with a dilute aqueous solution of lactic acid. By a first additional feature thereof, the lactic acid is used in a concentration range of about 5 ml/L to about 20 ml/L (w/w).

By a ninth feature of the lobster embodiment of this invention, and/or the above features thereof, the intact deepshoulder myotomal meat for cartilaginous skeletal attachments has been rapidly released, by having the raw head-shell immersed into an aqueous solution of a protease enzyme in the concentration of about 15 to about 55 (w/w) under temperature conditions ranging between about 15° C. and about 40° C. for a period of between about 2 minutes and about 8 minutes and in a pH range of about 5.0 to about 8.0. By a first additional feature thereof, deleterious changes in the functional properties of the raw lobster meat fraction have been eliminated, and, in which the action of the proteases enzyme has been terminated, by having the head-shell immersed in hot water which is held at a temperature of between about 80° C. and about 100° C. for a period of between about 10 seconds and about 75 seconds, and by having the head-shell being subjected to conditions of cold water immersion in a temperature range of between about 1° C. and about 10° C. for a period of between about 1 minute and about 5 minutes.

By a tenth feature of the lobster embodiment of this invention, and/or the above features thereof, the so-treated deep-shoulder myotomal meat has been removed from the head-shell by vacuum aspiration under about 15 inches of Hg. to about 25 inches of Hg.

By a first feature of this stuffing embodiment of this invention, the stuffing comprises female lobster roe which has been manually-removed from gravid female lobster and deep-shoulder myotomal meat from other lobsters. By a first additional feature thereof, the proportions of the female lobster roe and the deep-shoulder myotomal meat are in the range of between about 10% and about 50% by weight of the female lobster roe, and correspondingly corresponding between 90% and 50% by weight of the deep-shoulder myotomal meat. By a second additional feature thereof, the freeze-thaw stability and performance of the cooked, blended stuffing is ensured by providing the stuffing as a blend which also contains from about 1% by weight to about 10% by weight of a food grade starch.

By a second feature of this stuffing embodiment of this invention, and/or the above feature thereof, the stuffing is in the form of a mousse-like texture and a desirable pink coloration, by stem-cooking the stuffing until an internal temperature of between about 75° C. and about 85° C. is obtained.

By a third feature of this stuffing embodiment of this invention, and/or the above feature thereof, the intact deep-shoulder myotomal meat in the stuffing has been rapidly released, by having the raw head-shell immersed into an aqueous solution of a protease enzyme in the concentration of about 15 to about 55 (w/w) under temperature conditions ranging between about 15° C. and about 40° C. for a period of between about 2 minutes and about 8 minutes and in a pH range of about 5.0 to about 8.0. By a first additional feature thereof, deleterious changes in the functional properties of the raw lobster meat fraction have been eliminated, and, in which the action of the proteases enzyme has been terminated, by having the head-shell immersed in hot water which is held at a temperature of between about 80° C. and about 100° C. for a period of between about 10 seconds and about 75 seconds, and by having the head-shell being subjected to conditions of cold water immersion in a temperature range of between about 1° C. and about 10° C. for a period of between about 1 minute and about 5 minutes. By a second variation thereof, the so-treated deep-shoulder myotomal meat has been removed from the head-shell by vacuum aspiration under about 15 inches of Hg. to about 25 inches of Hg.

Generalized Description of the Invention

In accordance with a generalized aspect of this invention, a method is provided for preparing an intact stuffed lobster product. The method utilizes raw roe from gravid female lobsters which is blended with raw deep-shoulder myotomal meat which is extracted by the aid of protease enzyme and vacuum techniques from the deep-shoulder section of uncooked lobsters. In a first step, lobsters, which are killed by hot water immersion and chilled by cold water immersion, are subjected to evisceration of the anterior visceral cavity by oral insertion of a vacuum aspirator. Accompanying the evisceration procedure, a back-flushing process serves to irrigate and wash the visceral cavity with a weak solution of an organic acid. In a second step, the posterior intestinal tract is cleaned, by posterior insertion of a vacuum aspirator incorporating a back-flushing procedure as described above. In a third step, the head-shell of freshly killed lobsters, from which the claws, leg parts and dorsal carapace shell material have been removed, are subjected to immersion in a solution of protease enzymes to facilitate detachment of raw edible muscle (meat) from deep-shoulder cartilaginous skeletal attachments. Following this procedure, the head-shell material is subjected to hot water immersion to terminate further action of the applied protease enzymes, followed by immersion in cold water to eliminate excess thermal inputs causing deteriorative changes in the functional properties of the raw meat fraction. In an alternative third step, the head-shell of freshly killed lobsters, from which the claws, leg parts and dorsal carapace shell material have been removed, are subjected to at least one freeze-thaw cycle. From this point, the head-shell material is subjected to vacuum aspiration to remove the raw meat fraction, which is then retained under either chilled or frozen conditions. In a fourth step, roe which has been manually-separated from the posterior head-shell region of a freshly-killed gravid female lobster, is blended in certain proportions with deep-shoulder extracted meat to form a creamy liquid. During this step, an edible binder, e.g., starch may be added to provide freeze-thaw stability and texture to the final product. In a fifth step, the stuffing blend is intubated via the oral orifice into the visceral cavity of previously-eviscerated lobster. A brief mechanical vibration of the lobster is conducted to ensure that the filling procedure is complete and evenly-distributed, and that air in the visceral cavity has been minimized. In a sixth step, the eviscerated raw lobster containing the stuffing blend is either frozen or subjected to steam cooking. Implicit to the steam cooking procedure is the arrangement of the lobster with the ventral surface facing uppermost. In a seventh step, following steam cooking, the stuffed lobster product is subjected to spray irrigation with cold water to eliminate overcooking and to maintain textural and sensory integrity of the product. The product is subsequently frozen. In an eighth step, either raw eviscerated lobster, stuffed raw lobster and/or stuffed cooked lobster is optionally-subjected to bi-sectional cutting along the longitudinal axis, or is allowed to remain as an intact product, and is then packaged, preferably by means of vacuum sealing in a flexible barrier pouch. The raw stuffed product, so prepared, is subsequently thawed and preferably steam-cooked prior to utilization. The cooked stuffed product, so prepared, is subsequently thawed and presented, either as whole lobster, bi-sectional split lobster as two halves, or it can be bi-sectioned at point of presentation. The cooked product, so prepared, can be served either cold or subjected to warming-over, as desired.

BRIEF DESCRIPTION OF THE DRAWINGS

In the accompanying drawings.

DESCRIPTION OF THE PRIOR ART

Figure 1:
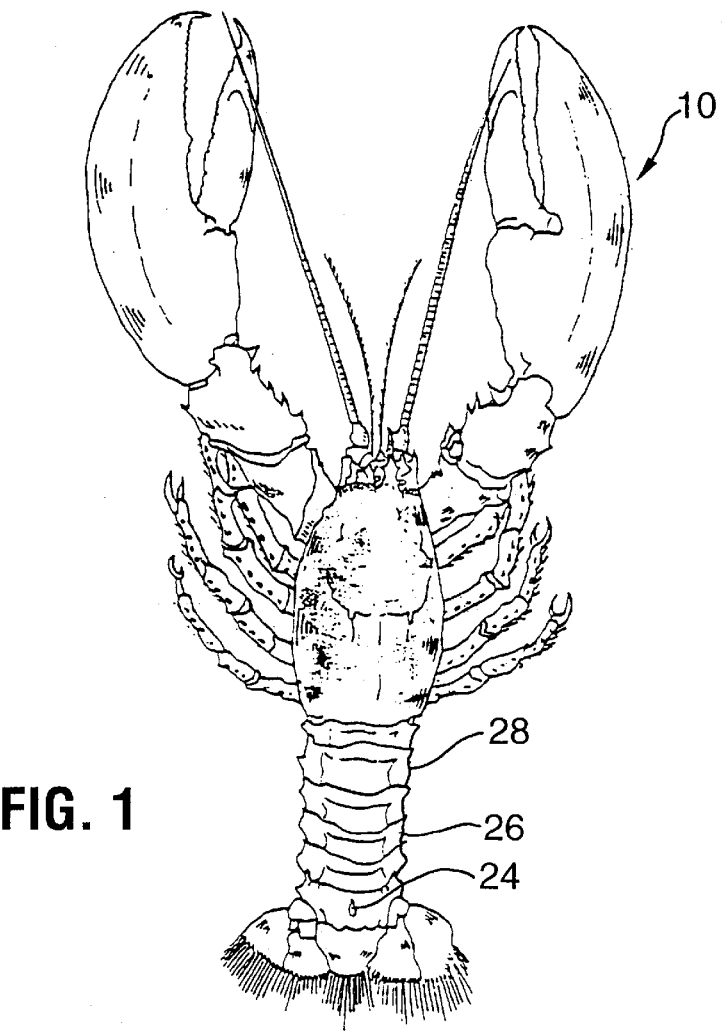
FIG. 1 is a top view of a whole lobster.
Figure 2:
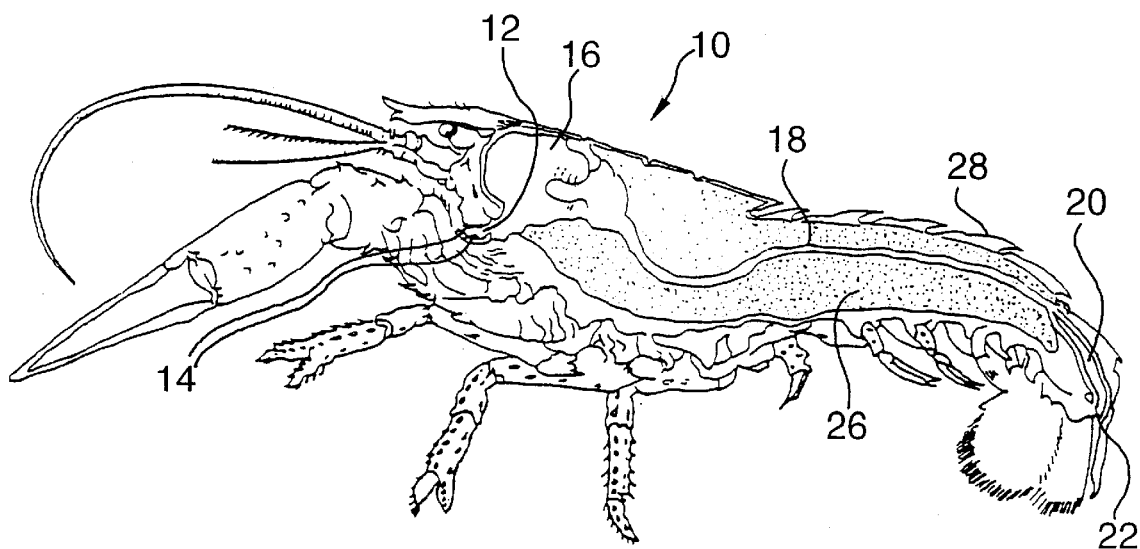
FIG. 2 is a side view, in half-section, of a whole lobster.

One technique of cleaning-out the internal system of a lobster is by flushing-out with a suitable solution. Referring to FIGS. 1 and 2, flushing of a lobster 10 can be carried-out by inserting a spray nozzle (not seen) into the mouth 12 of the lobster 10 through mandibles. Generally, sea water or salt water, which is at room temperature or colder, is sprayed through the spray nozzle, under a pressure of from 5 psig to 20 psig. Most lobsters can be flushed-out in 3 seconds to 20 seconds using this technique. The stomach contents are generally flushed-back-out through the mouth 12, thus cleaning-out the stomach 14. Moreover, the pressurized water is effective to flush-out the undesirable contents of the intestinal track 18 and cloaca 20 through the anus 22. In this manner, the organic and inorganic debris is eliminated from the gastrointestinal system of the lobster.

One described spray nozzle device for carrying-out the flushing step, as taught by the prior art, is a thin hollow tube having a 1/16 inch orifice at the end, and four additional 1/16 inch orifices, spaced at 90° intervals about the side walls of the tube. Effective flushing is achieved when the spray nozzle is inserted through the mouth 12 and the mandibles 14 of the lobster 10, and is thereafter rotated-about by hand within the lobster 10.

Although the above-described flushing technique for removing the contents of the internal organs of the lobster is effective, another technique for cleaning-out the hind-gut of the lobster, as taught by the prior art, involves suction evisceration. This technique comprises making a small slit 24 in the abdomen (lobster tail) 26 in the area of the cloaca 20 of the lobster 10. Although this slit may be made on the top-side or the under-side of the lobster, the slit should be made through the posterior part of the abdominal shell 28 on the top-side of the lobster 10. A vacuum tube (not seen) is then inserted through the slit 24, and is used to suck-out the whole hind-gut comprising the intestinal tract (vein) 18 and cloaca 20. Suction evisceration of the hind-gut is generally always carried-out prior to cooking.

As taught by the prior art, the suction nozzle (not seen) will generally have an inside diameter of 1/4 inch, in order effectively to remove the hind-gut of the lobster 10. Also, the nozzle (not seen) will generally be operated under a vacuum of from 15 inches to 25 inches Hg, and removal of the hind-gut can generally be accomplished in from 3 seconds to 5 seconds.

The stomach 16 of the lobster 10 can subsequently be removed by insertion of the suction nozzle through the mouth 12 between mandibles 14. Suction removal of the stomach 16 and the stomach contents generally requires a longer period of time than the suction-removal of the hind-gut, and usually will require from 5 seconds to 15 seconds.

DESCRIPTION OF PREFERRED EMBODIMENTS

The method of one embodiment of this invention will now be described with reference to the processing of clawed lobsters of the Homaridae family. However, it is desired to emphasize that, with suitable modifications which will be apparent to those skilled in the art, this method can also be applied to the clawless Spiny lobster and Rock lobster species of temperate and tropical origin and including species of the genera Panulirus, Jasus and Chelonectes crab, and to lobster-like crustaceans, including some types of prawn, Nephrops norwegicus and freshwater crayfish species.

Figure 3A:
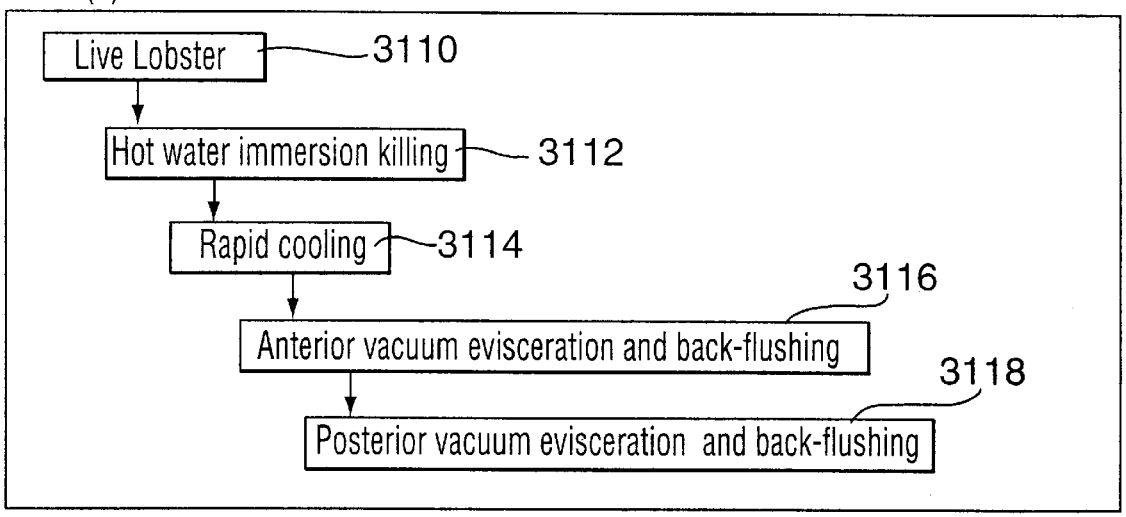
FIG. 3A illustrates one embodiment of the invention as a flow chart of the first two out of five preparative steps which are followed to obtain the stuffed lobster product.
Figure 3A:
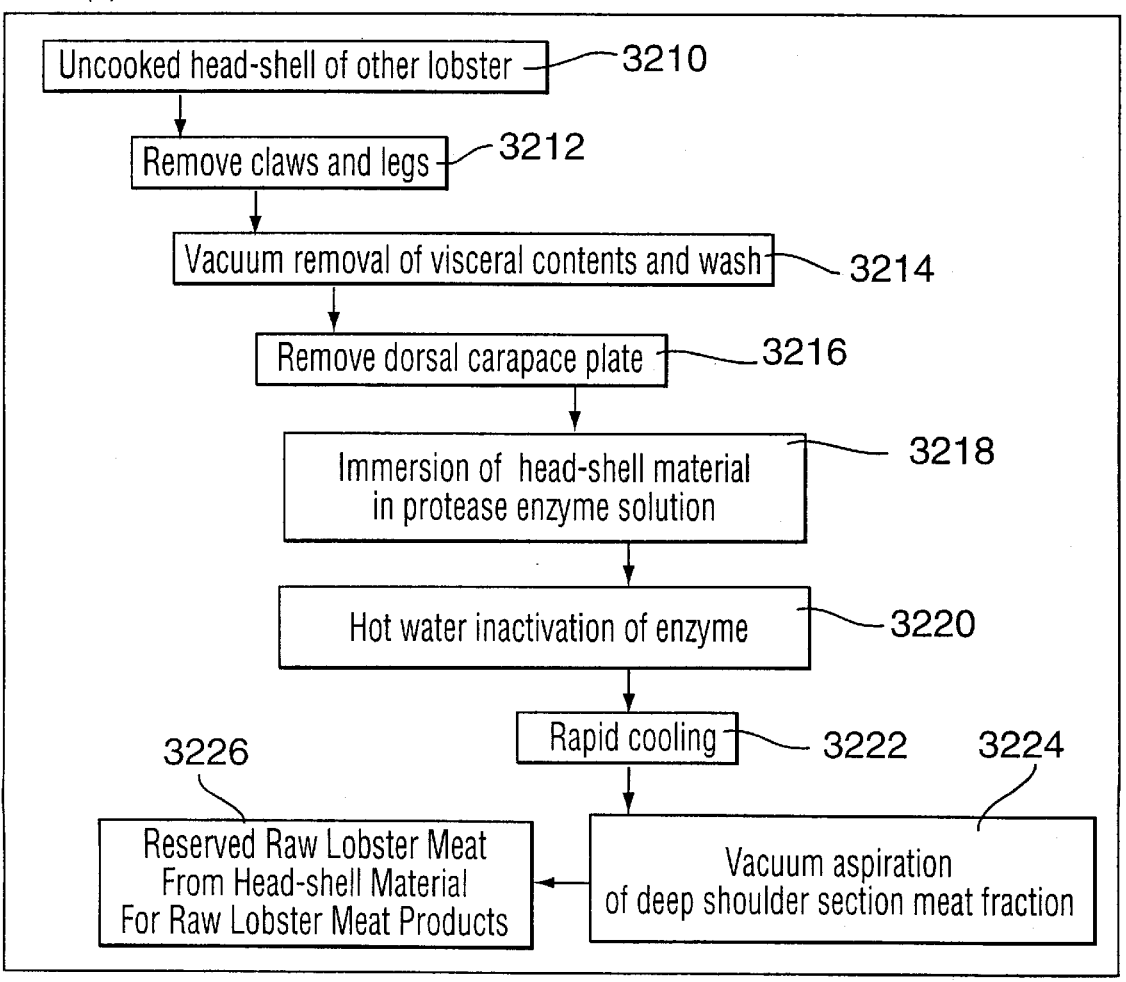
Figure 3B:
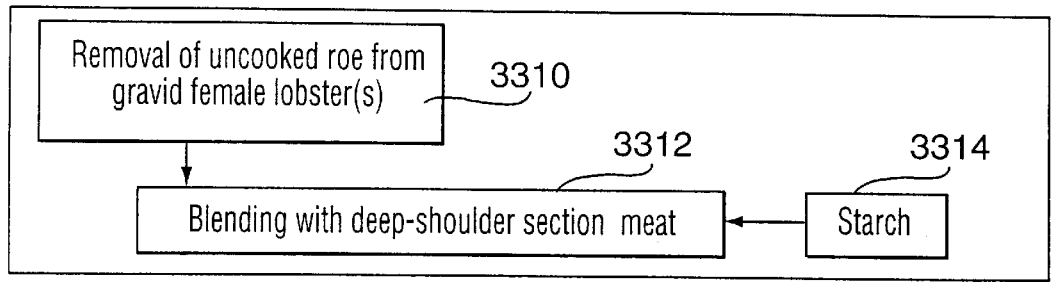
FIG. 3B illustrates one embodiment of the invention as a flow chart of the last three out of five preparative steps which are followed to obtain the stuffed lobster product.
Figure 3B:
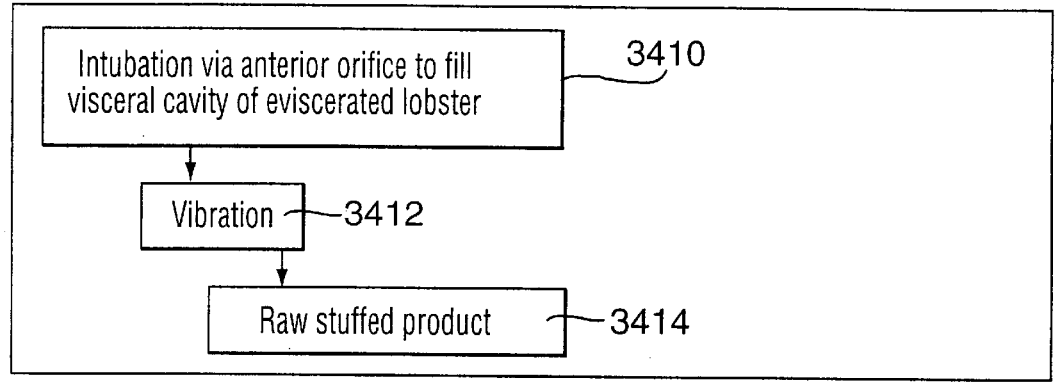
Figure 3B:
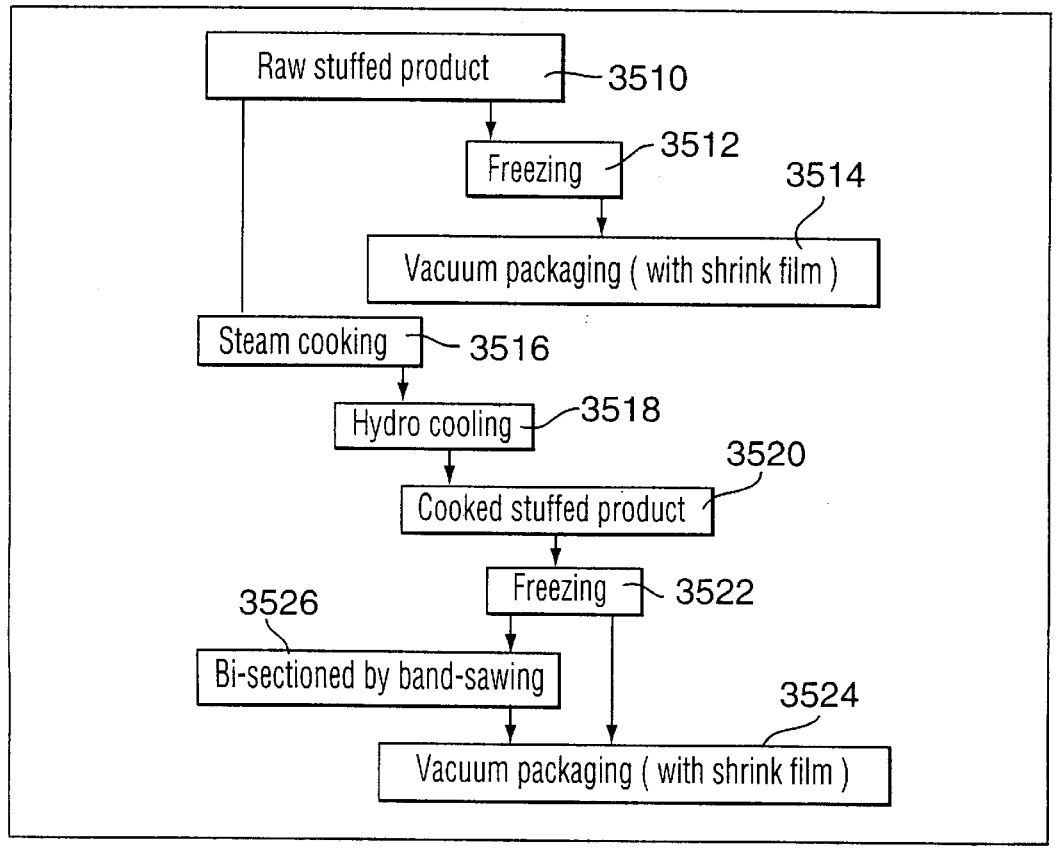

Description of FIG. 3A and FIG. 3B

The methods involved in one embodiment of the present invention for preparing a stuffed lobster product is comprised of five steps, respectively referred to as (1), (2), (3), (4) and (5), and are described with reference to FIG. 3A and FIG. 3B.

Step (1)

The first step, Step (1), of the method of this final embodiment of this invention, involves killing of live lobsters (block 3110) by hot-water blanch immersion (block 3112), in conditions ranging between 50° C. and 95° C., for a duration of between 40 seconds to 80 seconds, with immediate transfer to cold water conditions (block 3114) ranging between 0° C. to 10° C. for a duration of between 2 minutes to 10 minutes. Lobsters, so-treated, are then subjected to vacuum evisceration of the anterior visceral region (block 3116), e.g., as described above, using a vacuum aspirator nozzle of between 10 cm to 16 cm in length with a diameter of between 5 mm to 10 mm inserted into the oral cavity. Concurrently with this procedure, a back-flushing pipe attached to the vacuum nozzle supplies a dilute solution of lactic acid in a concentration range of 5 mg/L to 20 mg/L (w/w) as a bacteriostatic agent. The vacuum is applied in the range of 15 inches to 25 inches of Hg and the visceral contents are removed in a period of time ranging between 5 seconds to 15 seconds. Following this procedure, a second vacuum aspirating nozzle with a length ranging between 5 cm to 15 cm and a diameter of between 1 mm to 5 mm is inserted into the anal orifice, to effect vacuum cleaning, and concurrently back-flush irrigation (block 3118) with a dilute solution of lactic acid in a concentration range of 5 mg/L to 20 mg/L (w/w) as a bacteriostatic agent. The latter procedure is preferably accomplished within a period of between 5 seconds and 20 seconds. In a preferred embodiment, the above eviscerated and back-flushed lobster product is maintained in either a fresh or frozen-thawed condition prior to inclusion of the stuffing-blend material.

Step (2)

In the second step, Step (2) of the method of this first embodiment of the invention, raw head-shell sections of lobsters (block 3210), generally-derived from lobsters which have been subjected to raw-tail-severance procedures, are then subjected to vacuum removal of visceral contents and washing, as previously-described (block 3214). Then the lobster is prepared by manual removal of legs and claws (block 3212), prior to the manual removal of the dorsal carapace plate (block 3216), which reveals the remaining head-shell section containing the edible meat fractions which are intimately-connected and associated with the cartilaginous exoskeleton. Particularly, the deep-shoulder sections yielding up to 5% of edible meat fraction from the lobster are the focus of this second step. Head-shell carapace material, so-prepared, is subjected to immersion in a food-grade protease enzyme solution (block 3215), under temperature conditions ranging between 15° C. to 45° C. for a period ranging between 2 minutes to 8 minutes. The protease enzyme solution provides a concentration ranging between 1% to 5% (w/w) and maintained within a pH range of 5.0 to 8.0.

As taught by the prior art, this treatment with a protease enzyme may, alternatively, be effected using a synergistic combination of proteolytic enzymes with diastatic enzymes.

The synergistic combination of proteolytic enzymes with diastatic enzymes could be particularly-effective when used with crustacea, e.g., lobster, which have a shell which is composed of substantial amounts of chitin. The diastatic enzymes readily hydrolyse the chitin, so as substantially to loosen the edible portion of the lobster. At the same time, the effect of the proteolytic enzymes upon the protein of the shell of the lobster is enhanced, to effect a complete breakdown of the shell and thus, to expose the edible flesh.

An optional third type of enzyme, e.g., cellulase enzymes, may also be used to convert the material in the shell and connecting tissue in the crustacea, e.g., lobsters into lower molecular weight saccharides. The cellulase enzymes are particularly-effective upon the chitin, and soften and partially-dissolve the chitin more rapidly and more completely, than the use of the proteolytic and diastatic enzymes in combination.

Proteolytic enzymes, which may be used, include those that may be of plant, animal or micro-organism sources. Examples of those useful proteolytic enzymes are papain, ficin, and bromelin which find their source in plants. Other proteolytic enzymes which are obtainable from animals include the enzymes e.g., trypsin, chymotrypsin and pancreatin. Other enzymes obtainable from moulds include e.g., *Aspergillus wentii* and *Aspergillus oryzae*. Bacterially-derived enzymes obtained from culturing-bacteria organisims, e.g., *Bacillus mesenteroides, Bacterium subtilis* and *Clostridium welchii*. The amount of proteolytic enzymes to be used in the aqueous bath ranges from 60% to 96% by weight of all enzymes in the solution.

Examples of proteolytic enzymes are proteinases e.g., acrosin, urokinase, uropepsin, elastase, enteropeptidase, cathepsin, kallikrein, kininase 2, chymotrypsin, chymopapain, collagenase, streptokinase, subtilisin, thermolysin, trypsin, thrombin, papain, pancreatin peptidase, ficin, plasmin, renin peptidase and rennin, aminopepetidases, e.g., carnosinase and prolinase, peptidases e.g., pronase, and other proteolytic enzymes, as well as, denatured products and compositions thereof.

Examples of proteolytic microorganisms are moulds belonging to the genera Aspergillus, Mucor, Rhizopus, Penicillium and Monascus, lactic acid bacteria belonging to the genera Streptococcus, Pediococcus, Leuconostoc and Lactobacillus, bacteria e.g., *Bacillus natto* and *Bacillus subtilis,* and yeasts e.g., *Saccharomyces ellipsuideus, Saccharomyces cerevisiae* and Torulla, as well as, mutants and compositions thereof.

Diastatic enzymes are useful to convert polysaccharides e.g., chitin or starch, into less complex compounds, e.g., dextrin, dextrose or maltose. Typical of such diastatic enzymes are both alpha and beta amylose and amyloglucoside. The diastatic enzymes should be present in the bath in the amount varying between 4% to 40% by weight of all enzymes present.

The cellulase enzymes converting cellulose and cellulase derivatives to lower molecular saccharides are present in seeds, bacteria and moulds. The cellulase enzymes, though optional, may be present in an amount of between 1% and 20% by weight of the total enzymes present.

To form a treating bath, the mixture of enzymes is dissolved in water in an amount to produce a concentration of enzymes of between 0.01% to 5%.

The bath, for immersing the crustaceans, e.g., lobsters, generally should be at a temperature above 32° C., and may be at a temperature as high as 80° C. Usually, 57° C., is the preferred maximum. The time for immersion may vary, and like the temperature, the time is not critical, but, generally, may range from between 45 minutes and 300 minutes, while between 45 minutes to 200 minutes is preferable. The pH of the enzymatic treating bath is also not critical, and may range from between 2.8 to 8.5 pH, which may be maintained, if necessary, by conventional acids, e.g., citric or alkalis and/or by the use of salts which produce a buffering action, e.g., sodium bicarbonate.

The crustaceans may then be deposited into a container, which is preferably constructed of a non-reactive material, e.g., stainless steel, which has provision for enclosing the contents. The crustaceans are covered with the aqueous solution of the enzymes, which may be circulated through the seafood, in an amount that may vary between equal parts of the treating solution per part of the edible final product up to 20 or more parts, by weight solution per part edible product. Any amount greater than 20:1 is not warranted, for economic reasons.

After the enzymes have been in contact with the crustaceans, e.g., lobsters, crabs, etc., for a time of between 45 minutes to 200 minutes, at a temperature above 32° C. to below 80° C., it will be found that, the bone is weakened and partially-dissolved along with the thin layer of connective tissues between the shell and the adductor muscles. While it is not desired to be bound by any particular theory, it is believed that the proteolytic enzymes are active, for instance, in hydrolysing the collagen present in these connective tissues, substantially to loosen the edible portion of the lobster, so that it may be subsequently-removed from the shell.

Following immersion of the head-shell material in the protein enzyme solution, the material is drained and transferred to hot water immersion conditions (block 3220), at a temperature ranging from between 80° C. and 100° C. for a period of between 10 seconds and 75 seconds, to render residual enzyme activity terminated, and, thereby, maintain the integrity of the raw muscle tissue. Under such conditions, the muscle tissue is sufficiently-loosened from the skeletal attachments, so as to be favourably-removed by subsequent vacuum aspiration procedures. After hot-water immersion, the head-shell material is immediately-transferred to cold water conditions for rapid-cooling (block 3222), at a temperature range of between 1° C. and 10° C. for a period of time between 3 minutes and 8 minutes. This procedure provides for rapid cooling of the material and maintenance of the quality attributes of the meat components. The loosened meat is then removed from the deep-shoulder compartments by vacuum aspiration (block 3224), utilizing a vacuum nozzle of between 10 cm to 16 cm length and a diameter of between 5 mm and 10 mm. Meat so-removed, is collected in pan-traps which are associated with the vacuum line, providing a vacuum between 15 inches to 25 inches of Hg. In this first embodiment, vacuum extraction of between 1 kg to 2 kg per person/hour of raw meat material can be obtained. The meat so-extracted can either be held chilled, or frozen prior to further use, for the stuffing recipe to be described in Step (3), hereinafter, or it may be reserved for other applications in other conventional raw lobster meat products and recipes (block 3226).

Step (3)

In the third step, Step (3), of the method of this aspect of this invention, raw roe is removed from gravid female lobsters (block 3310), and the lobster is often subjected to traditional raw-tail severance processing methods. The roe is manually-extracted and subjected, either to chilling, or freezing under vacuum conditions. If frozen, the roe must be thawed prior to blending with the deep-shoulder myotomal meat which has been extracted according to procedures described in the above Step (2). The roe and the white meat fractions are blended together (block 3312) in a proportion ranging from between 10% to 50% for the roe, and correspondingly 90% to 50% for the deep-shoulder myotomal meat extract. The blending procedure is preferably achieved by use of a food processor, e.g., the one sold by Mari-tech Ltd. (Canada) until a creamy liquid consistency is achieved. During such processing, from 900 g to 990 g per kilogram of blend, and, e.g., from 10 g to 100 g of an edible starch, e.g., the one sold by Nacan Products Limited (USA), is added to the blend (block 3314), to ensure its freeze-thaw stability. The lobster roe and deep-shoulder myotomal meat blend (block 3310) is mixed with the starch (block 3314). The lobster roe and deep-shoulder myotomal meat blend (block 3310) to the starch (block 3314) weight ratio may vary from between 5:5 to 9:1; a desirable range may be from 6:4 to 8:2.

The paste of lobster roe and deep-shoulder myotomal meat blend and starch mixture (block 3312) may be mixed under reduced pressure. Ordinarily, the mixing under reduced pressure may be accomplished by agitating in an agitator that can be sealed hermetically, and can provide inside an environment of reduced pressure. The degree of reduced pressure is e.g., 0 mm to 260 mm Hg. According to this first embodiment of the present invention, the mixture may be agitated rapidly at a reduced pressure near vacuum. The mixing may be successfully-accomplished under such reduced pressure, at 260 mm of Hg pressure or less.

Examples of suitable agitators include a mixer, kneader, cutter, and so on which permit adequate agitation, e.g., one where all, mixer, etc., can be utilized at one time. For example, an agitator which may be used is one that is provided with a moving vane inside thereof, which rotates at the rate of 40 rpm. The agitator may be provided with a cover in the upper part to be sealed hermetically, and is connected with a decompression device via a hose to keep the pressure of 0 mm to 260 mm Hg inside the agitator. At this point, the liquid-blend can either be frozen, preferably under vacuum, or intubated into eviscerated lobsters in the chilled form.

Step (4)

In the fourth step, Step (4) of the method of this first embodiment of this invention, the raw blend material prepared from raw roe and deep-shoulder myotomal meat components, as described above, are introduced into the eviscerated and back-flushed visceral cavity of the lobster, via oral intubation (block 3410). In this procedure, a metering pump can be utilized, e.g., the one sold by Mari-tech Ltd. (Canada). Dependent upon the size range of the lobster, the amount of blend introduced in the oral cavity will vary. By way of example, the principles of this first embodiment of this invention can be applied to lobsters of varying size range, and most commonly weigh between 250 g and 1.5 kg. Such amounts required to fill the visceral cavity of lobsters amount to between 10% and 15% of the final weight of the lobster. Following metered filling of the visceral cavity, the lobster is subjected briefly to mechanical vibration (block 3412), wherein the filled lobster is maintained in a vertical position, with the oral cavity facing uppermost and subjected to a gentle vibrating force. In this procedure, any residual air pockets entrained within the visceral cavity are voided and a complete fill of the cavity is ensured. The final product of this step is a raw stuffed lobster product (block 3414).

Step (5)

In the final fifth step, Step (5), of the method of this aspect of the invention, the raw stuffed lobster product (block 3510) can either be frozen as is, for subsequent thawing and cooking (block 3512), and then vacuum-packed with shrunk-film (block 3514), or it can be subject to immediate cooking in atmospheric steam conditions (block 3516) of 100° C. Advantageously, very good results have been obtained by placing the raw stuffed lobster ventral side uppermost into a process dedicated steam chamber, e.g., the one sold for this purpose by Atlantic Systems Manufacturing Ltd. (Canada), with sufficient duration to achieve an internal temperature in the centre point of the stuffing blend of within the visceral cavity of between 70° C. to 85° C. This procedure is generally-achieved in a time-frame of between 15 minutes to 20 minutes, and serves approximately to cook the lobster and stuffed contents while still maintaining the integral tail, leg and claw meat sections in an optimal condition. Immediately following attainment of the desired internal temperature, of between 75° C. to 85° C., and to avoid post-cook drying of the delicate meat and stuffing blend, it has been proven necessary to cool the cooked product rapidly.

The optimal method of cooling the cooked lobster product has been to subject the cooked lobster to hydro-cooling by cold water spray irrigation (block 3518), directed as a drench to the dorsal surface of lobsters positioned with the dorsal surface uppermost. Most efficient results have been obtained through the use of a process-dedicated hydro-cooling device, e.g., the one sold by Atlantic Systems Manufacturing Ltd. (Canada). In such application, optimal results can be obtained through the use of either potable fresh water or sea water, in the temperature range of between 1° C. and 9° C., for a cooling period of between 5 minutes and 10 minutes, then effecting acceptable heat-reduction from within the centre of the lobster to between 20° C. to 30° . Other procedures involving immersion in ice-water mixes or ice per se can be utilized, but these procedures do not lend themselves to industrial applications.

As a part of this final step, either raw stuffed lobster is subjected to freezing (block 3512), or steam-cooked and cooled stuffed lobster is subjected to freezing conditions (block 3522). In either case, the frozen lobster is then packaged in vacuum-sealable pouches under deep vacuum, in the range of 25 inches to 30 inches of Hg (block 3514 or block 3524). Optionally, prior to packaging, frozen stuffed and cooked lobster can be bi-sectioned (block 3526), along the longitudinal axis by band-sawing and reconfigured as an intact product prior to vacuum packaging. In terms of the packaging material, optimum shelf-life results are obtained through use of a heavy-duty shrinkable film laminate, e.g., the material sold by Cryovac (Canada). Moreover, the subsequent film-shrinking by heat exposure serves to minimize potential for breakage of appendages and body parts of the lobster, which is a recognized problem due to the brittle shell characteristics of the lobster.

With the above-described preparative methods of this first embodiment of this invention, and with the equipment specifically-designed to support the procedures, up to 400 units per hour of finished lobster products can be processed, which is commercially interesting and appealing. The reserved raw deep-shoulder myotomal meat retrieved from the head-shell in Step (2) can be used for a variety of other lobster products.

The product, so-obtained, has proven to offer excellent taste and texture characteristics, served in either the intact form, or as bi-sectioned split halves. The product can be presented as either chill-thawed or re-warmed, as preferred by consumers. The high-quality appearance of the product is assured through definition of very white meat containing no visible intestinal content, nor hepatopancreatic visceral staining, and a very attractive coral pink stuffing, which through the preparative method is assured, of attaining very intimate entrainment and interface to the internal shell contours and anterior abdominal facet of the tail meat. The overall appearance is of a continuum of stuffing-blend and white tail meat. One important element of this first embodiment of this invention lies in the effective removal of all of the hepatopancreatic (tomalley) fraction from the raw lobster, and, thereby, minimization of residual trace heavy-metal content, which has been shown to migrate into the edible meat fraction during traditional cooking procedures applied to live lobster. In turn, this embodiment of this invention serves to meet ever increasingly-stringent requirements by nations for minimum acceptable tolerance levels for certain heavy-metal components.

Figure 4A:
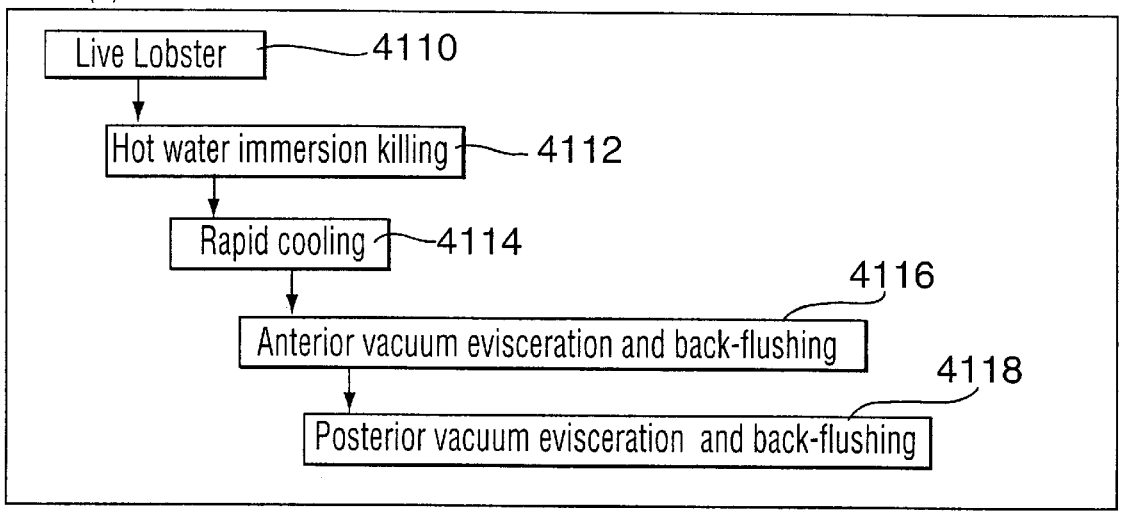
FIG. 4A illustrates a second embodiment of the invention as a flow chart of the first two out of five preparative steps which are followed to obtain the stuffed lobster product.
Figure 4A:
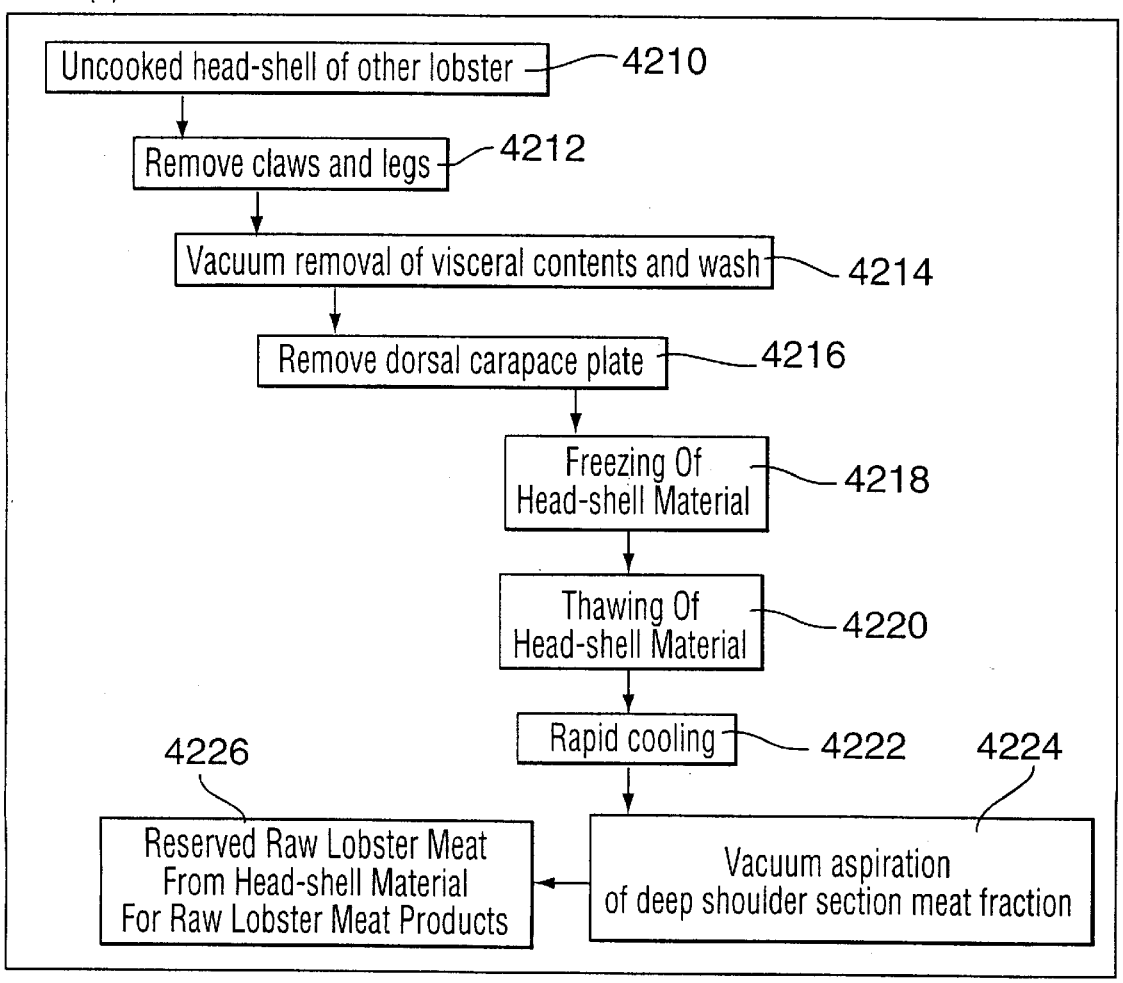
Figure 4B:
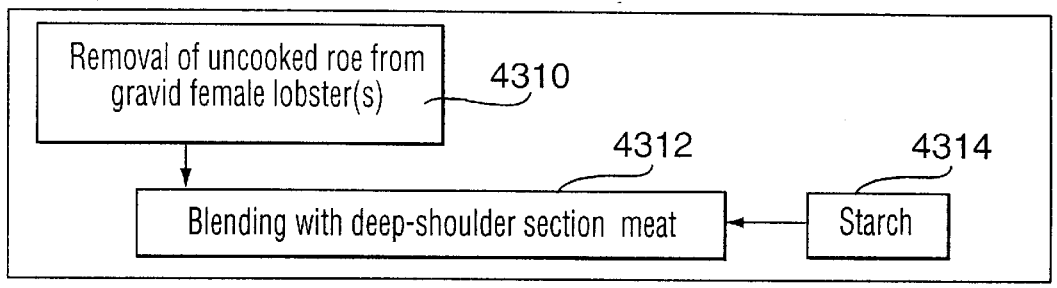
FIG. 4B illustrates a second embodiment of the invention as a flow chart of the last three out of five preparative steps which are followed to obtain the stuffed lobster product.
Figure 4B:
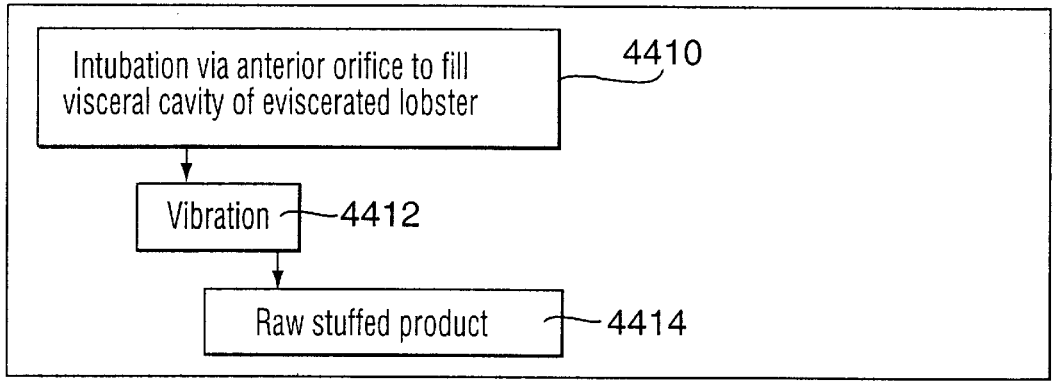
Figure 4B:
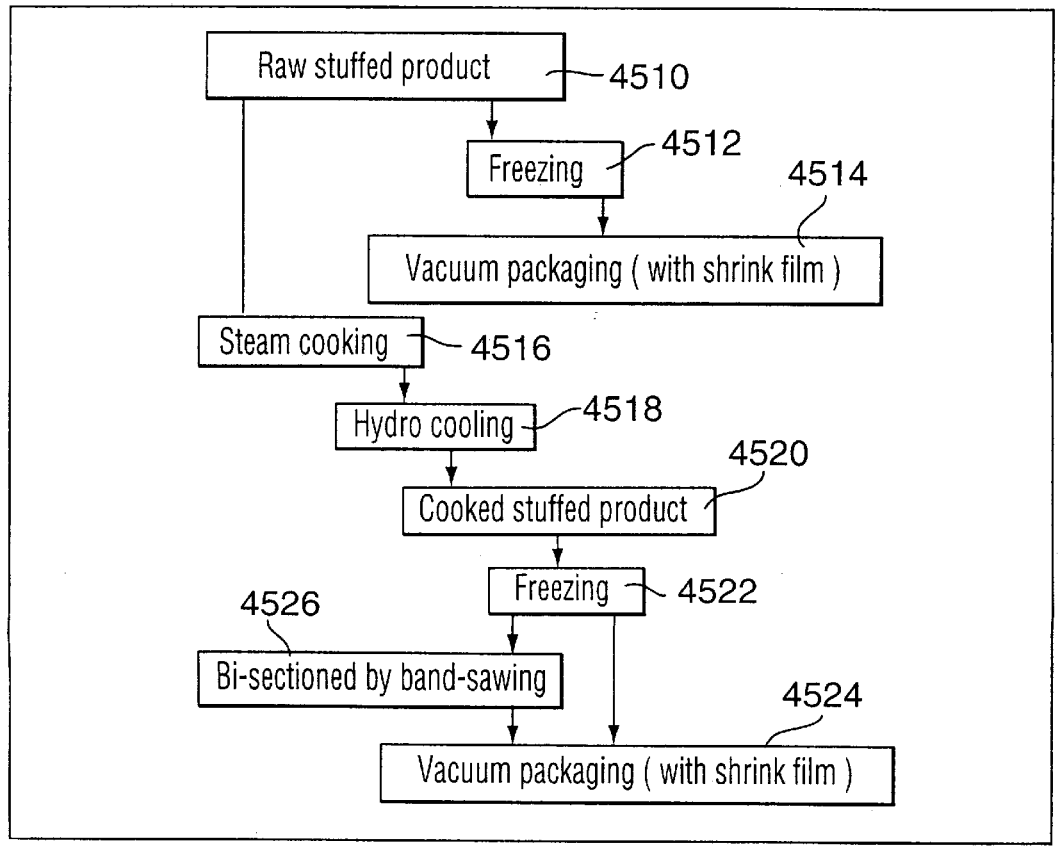

Description of FIG. 4A and FIG. 4B

The methods involved in a second embodiment of the present invention for preparing a stuffed lobster product is comprised of five steps, respectively referred to as (1), (2), (3), (4), and (5), and will now be described with reference to FIG. 4A and FIG. 4B.

Step (1)

The first step, Step (1), of the method of the second embodiment of this invention, involves killing of live lobsters (block 4110) by hot-water blanch immersion (block 4112), in conditions ranging between 50° C. and 95° C., for a duration of between 40 seconds to 80 seconds, with immediate transfer to cold water conditions (block 4114) ranging between 0° C. to 10° C. for a duration of between 2 minutes to 10 minutes. Lobsters, so-treated, are then subjected to vacuum evisceration of the anterior visceral region (block 4116), e.g., as described above, using a vacuum aspirator nozzle of between 10 cm to 16 cm in length with a diameter of between 5 mm to 10 mm inserted into the oral cavity. Concurrently with this procedure, a back-flushing pipe attached to the vacuum nozzle supplies a dilute solution of lactic acid in a concentration range of 5 mg/L to 20 mg/L (w/w) as a bacteriostatic agent. The vacuum is applied in the range of 15 inches to 25 inches of Hg and the visceral contents are removed in a period of time ranging between 5 seconds to 15 seconds. Following this procedure, a second vacuum aspirating nozzle with a length ranging between 5 cm to 15 cm and a diameter of between 1 mm to 5 mm is inserted into the anal orifice, to effect vacuum cleaning, and concurrently back-flush irrigation (block 4118) with a dilute solution of lactic acid in a concentration range of 5 mg/L to 20 mg/L (w/w) as a bacteriostatic agent. The latter procedure is preferably accomplished within a period of between 5 seconds and 20 seconds. In a preferred embodiment, the above eviscerated and back-flushed lobster product is maintained in either a fresh or frozen-thawed condition prior to inclusion of the stuffing-blend material.

Step (2)

In the second step, Step (2) of the method of this second embodiment of the invention, raw head-shell sections of lobsters (block 4210), generally-derived from lobsters which have been subjected to raw-tail-severance procedures, are then subjected to vacuum removal of visceral contents and washing, as previously-described (block 4214). Then the lobster is prepared by manual removal of legs and claws (block 4212), prior to the manual removal of the dorsal carapace plate (block 4216), which reveals the remaining head-shell section containing the edible deep-shoulder myotomal meat fractions which are intimately-connected and associated with the cartilaginous exoskeleton. Particularly, the deep-shoulder sections yielding up to 5% of edible deep-shoulder myotomal meat fraction from the lobster are the focus of this second step. Head-shell carapace material, so-prepared, is subjected to at least one cycle of freezing (block 4218) and thawing (block 4220), which facilitates the subsequent vacuum aspiration of the lobster meat from the deep-shoulder fraction.

Following the thawing procedure, the head-shell material is immediately transferred to cold water conditions for rapid cooling (block 4222), at a temperature range of between 1° C. and 10° C. for a period of time between 3 minutes and 8 minutes. This procedure provides for rapid cooling of the material and maintenance of the quality attributes of the deep-shoulder myotomal meat components. The loosened deep-shoulder myotomal meat is then removed from the deep-shoulder compartments by vacuum aspiration (block 4224), utilizing a vacuum nozzle of between 10 cm to 16 cm length and a diameter of between 5 mm and 10 mm. Deep-shoulder myotomal meat so-removed, is collected in pan-traps which are associated with the vacuum line, providing a vacuum between 15 inches to 25 inches of Hg. In this second embodiment, vacuum extraction of between 1 kg to 2 kg per person/hour of raw deep-shoulder myotomal meat can be obtained. The deep-shoulder myotomal meat so-extracted can either be held chilled, or frozen prior to further use, for the stuffing recipe to be described in Step (3), hereinafter, or it may be reserved for other applications in other conventional raw lobster meat products and recipes (block 4226).

Step (3)

In the third step, Step (3), of the method of the second embodiment of this invention, raw roe is removed from gravid female lobsters (block 4310), and the lobster is often subjected to traditional raw-tail severance processing methods. The roe is manually-extracted and subjected, either to chilling, or freezing under vacuum conditions. If frozen, the roe must be thawed prior to blending with the deep-shoulder section meat which has been extracted according to procedures described in the above Step (2). The roe and the deep-shoulder myotomal meat fractions are blended together (block 4312) in a proportion ranging from between 10% to 50% for the roe, and correspondingly 90% to 50% for the deep-shoulder myotomal meat extract. The blending procedure is preferably achieved by use of a food processor, e.g., the one sold by Mari-tech Ltd. (Canada) until a creamy liquid consistency is achieved. During such processing, from 900 g to 990 g per kilogram of blend, and e.g., from 10 g to 10 g of an edible starch, e.g., the one sold by Nacan Products Limited (USA), is added to the blend (block 4314), to ensure its freeze-thaw stability. The lobster roe and deep-shoulder myotomal meat blend (block 4310) is mixed with the starch (block 4314). The lobster roe and deep-shoulder myotomal meat blend (block 4310) to the starch (block 4314) weight ratio may vary from between 5:5 to 9:1; a desirable range may be from 6:4 to 8:2.

The paste of lobster roe and deep-shoulder myotomal meat blend and starch mixture (block 4312) may be mixed under reduced pressure. Ordinarily, the mixing under reduced pressure may be accomplished by agitating in an agitator that can be sealed hermetically, and can provide inside an environment of reduced pressure. The degree of reduced pressure is e.g., 0 mm to 260 mm Hg. According to this second embodiment of the present invention, the mixture may be agitated rapidly at a reduced pressure near vacuum. The mixing may be successfully-accomplished under such reduced pressure, at 260 mm of Hg pressure or less.

Examples of suitable agitators include a mixer, kneader, cutter, and so on which permit adequate agitation, e.g., one where all, mixer, etc., can be utilized at one time. For example, an agitator which may be used is one that is provided with a moving vane inside thereof, which rotates at the rate of 40 rpm. The agitator may be provided with a cover in the upper part to be sealed hermetically, and is connected with a decompression device via a hose to keep the pressure of 0 mm to 260 mm Hg inside the agitator. At this point, the liquid-blend can either be frozen, preferably under vacuum, or intubated into eviscerated lobsters in the chilled form.

Step (4)

In the fourth step, Step (4) of this second embodiment of this invention, the raw blend material prepared from raw roe and deep-shoulder myotomal meat components, as described above, are introduced into the eviscerated and back-flushed visceral cavity of the lobster, via oral intubation (block 4410). In this procedure, a metering pump can be utilized, e.g., the one sold by Mari-tech Ltd. (Canada). Dependent upon the size range of the lobster, the amount of blend introduced in the oral cavity will vary. By way of example, the principles of this second embodiment of this invention can be applied to lobsters of varying size range, and most commonly weigh between 250 g and 1.5 kg. Such amounts required to fill the visceral cavity of lobsters amount to between 10% and 15% of the final weight of the lobster. Following metered filling of the visceral cavity, the lobster is subjected briefly to mechanical vibration (block 4412), wherein the filled lobster is maintained in a vertical position, with the oral cavity facing uppermost and subjected to a gentle vibrating force. In this procedure, any residual air pockets entrained within the visceral cavity are voided and a complete fill of the cavity is ensured. The final product of this step is a raw stuffed lobster product (block 4414).

Step (5)

In the final fifth step, Step (5), of the method of the second embodiment of this invention, the raw stuffed lobster product (block 4510) can either be frozen as is, for subsequent thawing and cooking (block 4512), and then vacuum-packed with shrunk-film (block 4514), or it can be subject to immediate cooking in atmospheric steam conditions (block 4516) of 100° C. Advantageously, very good results have been obtained by placing the raw stuffed lobster ventral side uppermost into a process dedicated steam chamber, e.g., the one sold for this purpose by Atlantic Systems Manufacturing Ltd. (Canada), with sufficient duration to achieve an internal temperature in the centre point of the stuffing blend of within the visceral cavity of between 70° C. to 85° C. This procedure is generally-achieved in a time-frame of between 15 minutes to 20 minutes, and serves approximately to cook the lobster and stuffed contents while still maintaining the integral tail, leg and claw meat sections in an optimal condition. Immediately following attainment of the desired internal temperature, of between 75° C. to 85° C., and to avoid post-cook drying of the delicate meat and stuffing blend, it has been proven necessary to cool the cooked product rapidly.

The optimal method of cooling the cooked lobster product has been to subject the cooked lobster to hydro-cooling by cold water spray irrigation (block 4518), directed as a drench to the dorsal surface of lobsters positioned with the dorsal surface uppermost. Most efficient results have been obtained through the use of a process-dedicated hydro-cooling device, e.g., the one sold by Atlantic Systems Manufacturing Ltd. (Canada). In such application, optimal results can be obtained through the use of either potable fresh water or sea water, in the temperature range of between 1° C. and 9° C., for a cooling period of between 5 minutes and 10 minutes, then effecting acceptable heat-reduction from within the centre of the lobster to between 20° C. to 30° . Other procedures involving immersion in ice-water mixes or ice per se can be utilized, but these procedures do not lend themselves to industrial applications.

As a part of this final step, either raw stuffed lobster is subjected to freezing (block 4512), or steam-cooked and cooled stuffed lobster is subjected to freezing conditions (block 4522). In either case, the frozen lobster is then packaged in vacuum-sealable pouches under deep vacuum, in the range of 25 inches to 30 inches of Hg (block 4514 or block 4524). Optionally, prior to packaging, frozen stuffed and cooked lobster can be bi-sectioned (block 4526), along the longitudinal axis by band-sawing and reconfigured as an intact product prior to vacuum packaging. In terms of the packaging material, optimum shelf-life results are obtained through use of a heavy-duty shrinkable film laminate, e.g., the material sold by Cryovac (Canada). Moreover, the subsequent film-shrinking by heat exposure serves to minimize potential for breakage of appendages and body parts of the lobster, which is a recognized problem due to the brittle shell characteristics of the lobster.

With the above-described preparative methods of this second embodiment of this invention, and with the equipment specifically-designed to support the procedures, up to 400 units per hour of finished lobster products can be processed, which is commercially interesting and appealing.

The product, so-obtained, has proven to offer excellent taste and texture characteristics, served in either the intact form, or as bi-sectioned split halves. The product can be presented as either chill-thawed or re-warmed, as preferred by consumers. The high-quality appearance of the product is assured through definition of very white meat containing no visible intestinal content, nor hepatopancreatic visceral staining, and a very attractive coral pink stuffing, which through the preparative method is assured, of attaining very intimate entrainment and interface to the internal shell contours and anterior abdominal facet of the tail meat. The overall appearance is of a continuum of stuffing-blend and white tail meat. This second embodiment of this invention serves to meet ever increasingly-stringent requirements by nations for minimum acceptable tolerance levels for certain heavy-metal components.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

What is claimed is:

1. A method for removing meat from the head-shell of Homaridae lobster which comprises:

(a) initiating the detachment of the raw edible muscle meat from the deep-shoulder cartilaginous skeletal attachment by the step of:

immersing the head-shell in a solution of protease enzymes; and b) subjecting the so-treated head-shell to vacuum aspiration to remove, and recover, the raw meat fraction.

2. The method as claimed in claim 1, wherein said head-shell of step a is subsequently subjected to hot water inactivation of the enzyme.

3. The method as claimed in claim 2 comprising the step of exposing said treated head shell material to conditions of cold water in the temperature range of about 1° C. to about 10° C. for a period of between about 3 minutes to about 8 minutes to effect heat removal from said head-shell material.

4. The method as claimed in claim 2, which comprises the step of vacuum aspiration of the so-treated deep-shoulder section lobster meat fraction under about 15 inches of Hg. to about 25 inches of Hg.

5. The method as claimed in claim 2, wherein said raw head-shell is immersed in an aqueous solution of said protease enzyme of between about 1 and about 5 (w/w) for a period of between about 2 to about 8 minutes in a pH range of between about 5.0 and about 8.0 and at a temperature range of between about 15° C. and about 45° C.

6. The method as claimed in claim 5, which comprises the step of exposing said treated head-shell to water at a temperature of between about 80° C. and about 100° C. for between about 10 seconds and about 75 seconds to effect termination of protease enzyme activity.

7. The method as claimed in claim 6, which comprises the step of exposing said heated, treated head-shell material to cold water in the temperature range of about 1° C. to about 10° C. for a period of between about 3 minutes to about 8 minutes to effect heat removal from said head-shell material.

8. The method as claimed in claim 7, which comprises the step of vacuum aspiration of the loosened deep-shoulder myotomal meat from said deep-shoulder section of said treated head-shell material in the range of about 15 inches of Hg. to about 25 inches of Hg., thereby to recover said deep-shoulder myotomal meat.

9. The method as claimed in claim 5, which comprises blending deep-shoulder myotomal meat with female lobster roe which has been manually-removed from a gravid female lobster, thereby to prepare a raw blend comprising said female lobster roe and said deep-shoulder myotomal meat.

10. The method as claimed in claim 9, which comprises carrying out said blending in a food processor.

11. The method as claimed in claim 5, which comprises introducing said raw blend comprising said female lobster roe and said deep-shoulder myotomal meat into an anterior visceral cavity of previously eviscerated lobster by oral incubation and subsequently carrying out vibration to effect removal of residual air;

thereby to achieve effective filling of said anterior visceral cavity while effecting integuous contact between said stuffing blend and the contour of the inner shell surface and region of abutment of the internal and anterior abdominal facets of the tail meat of said previously-eviscerated lobster.

12. The method as claimed in claim 11, which comprises steam-cooking said stuffing until an internal temperature of between about 75° C. and about 85° C. is obtained;

thereby to confer a mousse-like texture and desirable pink coloration to said stuffing blend.

13. The method as claimed in claim 12, which comprises cooling said steam-cooked stuffed lobster by spray irrigation to the dorsal surface of said lobster;

thereby to effect rapid-cooling to avoid overcooking and thereby to maintain high quality and integrity to said lobster meat and to said stuffing.

14. The method as claimed in claim 5, which comprises accompanying said vacuum aspiration of said anterior visceral cavity and said posterior intestinal tract by back-flushing with a dilute aqueous solution of lactic acid;

thereby to confer a bacteriostatic property to said eviscerated lobster.

15. A method for removing meat from the head-shell of Homaridae lobster which comprises:

a) initiating the detachment of the raw edible muscle meat from the deep-shoulder cartilaginous skeletal attachment by the step of subjecting the head-shell to at least one freeze-thaw cycle; and b) subjecting the so-treated head-shell to vacuum aspiration to remove, and recover, the raw meat fraction.

16. The method as claimed in claim 15, further comprising subjecting said head-shell to a freezing procedure at a temperature ranging between about −10° C. and about −20° C., followed by thawing of the frozen head-shell until a temperature of between about 4° C. and about 12° C. is reached.

17. The method as claimed in claim 15, which comprises the post-thawing step of exposing said treated head-shell material to conditions of cold water treatment in the temperature range of about 1° C. to about 10° C. for a period of between 1 minute to 10 minutes to effect heat removal from said head-shell material.

18. The method as claimed in claim 17, which comprises the step of exposing said treated head-shell material to conditions of cold water in the temperature range of about 1° C. to about 10° C. for a period of between about 3 minutes to about 8 minutes to effect heat removal from said head-shell material.

19. The method as claimed in claim 15, which comprises the step of vacuum aspiration of the so-treated deep-shoulder section lobster meat fraction under about 15 inches of Hg. to about 25 inches of Hg.

20. A method for preparing stuffed, intact, whole, Homaridae lobster, which comprises:

vacuum eviscerating the anterior and posterior sections of said lobster;

back flushing said anterior and posterior sections of said lobster for the removal of the visceral and intestinal contents of said lobster; and filling said anterior visceral cavity of said lobster with a stuffing comprising a raw stuffing blend comprising female Homaridae lobster roe and deep-shoulder myotomal meat which has been recovered from a Homaridae lobster, or Homaridae lobsters;

thereby providing stuffed, intact, whole, lobster.

21. The method as claimed in claim 20, which comprises cooking said stuffed, intact, whole, lobster at about 100° C. for a sufficient time to achieve internal carapace temperature of at least about 75° C. followed by subsequent rapid cooling to effect rapid temperature removal, and finally freezing said stuffed, intact, whole, lobster.

22. The method as claimed in claim 21, wherein said cooking of said stuffed, intact, whole lobster is by steam-cooking.

23. The method as claimed in claim 22, which comprises blending between about 10 and about 50% by weight of female lobster roe with correspondingly between about 90% and about 50% by weight of deep-shoulder myotomal meat.

24. The method as claimed in claim 23 further containing lactic acid, wherein said lactic acid has a concentration range of 5 to 20 ml/L (w/w).

25. The method as claimed in claim 22, which comprises the step of additionally blending therein from about 1% by weight to about 10% by weight of a food grade starch;

thereby to ensure freeze-thaw stability and performance of said cooked blended stuffing.

26. The method as claimed in claim 21, wherein said cooling of said cooked, stuffed, intact, whole, lobster is by spray irrigation.

27. The method as claimed in claim 20, which comprises first removing claws, legs and dorsal shell plate and visceral contents from said lobster, and comprising dislocating deep-shoulder myotomal meat from attachment to cartilaginous appendages by means of immersing said head-shell in a solution of protease enzymes.

28. The method as claimed in claim 20, which comprises first removing claws, legs and dorsal shell plate and visceral contents from said lobster, and comprising dislocating deep-shoulder myotomal meat from attachment to cartilaginous appendages by means of subjecting said head-shell to at least one freeze-thaw cycle.

29. A stuffed, intact, whole Homaridae lobster in which the visceral and intestinal contents of said lobster have been removed, said lobster then being filled with a stuffing comprising a raw blend comprising female Homaridae lobster roe and deep-shoulder myotomal meat which has been recovered from said Homaridae lobster, or from another Homaridae lobster or from other Homaridae lobsters.

30. The stuffed, intact, whole, lobster as claimed in claim 29, in the form of frozen said stuffed, intact, whole, lobster.

31. The stuffed, intact, whole, Homaridae lobster as claimed in claim 29, in the form of cooked, stuffed, intact, whole, lobster which has been cooked at about 100° C. for a sufficient time to achieve an internal carapace temperature of at least about 75° C.

32. The stuffed, intact, whole, Homaridae lobster as claimed in claim 31, in the form of a cooked, stuffed, intact, whole lobster which has then been rapidly-cooled to effect rapid temperature removal.

33. The stuffed, intact, whole, Homaridae lobster as claimed in claim 32, in the form of steam-cooked said stuffed, intact, whole lobster.

34. The stuffed, intact, whole, Homaridae lobster as claimed in claim 32, in the form of frozen steam-cooked and spray-irrigated-cooled said stuffed, intact, whole, lobster.

35. The stuffed, intact, whole, Homaridae lobster as claimed in claim 29, in which effective filling of said anterior visceral cavity is ensured to effect integuous contact between said stuffing and the contour of the inner shell surface and the region of abutment of the internal and anterior abdominal facets of the tail meat of said lobster by having said stuffing introduced into said anterior visceral cavity of a previously-eviscerated lobster by oral incubation and by subsequent vibration to effect removal of residual air.

36. The stuffed, intact, whole, Homaridae lobster as claimed in claim 35, in which said stuffing is in the form of mousse-like texture and desirable pink coloration by having said stuffing steam-cooked until an internal temperature of between about 75° C. and about 85° C. is obtained.

37. The stuffed, intact, whole, Homaridae lobster as claimed in claim 36, in which overcooking is avoided and thereby in which high quality and integrity to said lobster meat and to said stuffing is maintained by having said steam-cooked stuffed lobster subsequently-cooled by spray irrigation to the dorsal surface of said lobster.

38. A stuffing for a stuffed, intact, whole Homaridae lobster in which the visceral and intestinal contents of said Homaridae lobster have been removed, said stuffing comprising a raw blend comprising female Homaridae lobster roe and deep-shoulder myotomal meat which has been removed from said Homaridae lobster, or from another Homaridae lobster, or from other Homaridae lobsters.

39. The stuffing as claimed in claim 38, comprising female lobster roe which has been manually-removed from gravid female lobster and deep-shoulder myotomal meat which has been removed from said lobster, or from another lobster, or from other lobsters.

40. The stuffing as claimed in claim 39, wherein the proportions of said female lobster roe and said deep-shoulder myotomal meat are in the range of between about 10% and about 50% by weight of said female lobster roe and correspondingly between about 90% and about 50% by weight of said deep-shoulder myotomal meat.

41. The stuffing as claimed in claim 40, which also comprises from about 1% by weight to about 10% by weight of said food grade starch, in order to ensure freeze-thaw stability and performance of said cooked blended stuffing.

42. The stuffing as claimed in claim 39, in the form of mousse-like texture and desirable pink coloration, which is provided by steam-cooking said stuffing until an internal temperature of between about 75° C. and about 85° C. is obtained.

43. A method for preparing stuffed cooked whole Homaridae lobsters, comprising: anterior and posterior vacuum eviscerating and back-flushing removal of the visceral and intestinal contents with subsequent incubation and filling of said anterior visceral cavity with a raw liquid blend comprised of female lobster roe and deep-shoulder myotomal meat sourced from said lobster, or from other lobsters thereby providing an intact whole lobster so-stuffed, steam-cooking said lobster at about 100° C. for sufficient time to achieve internal carapace temperature of about 80° C. and subsequently rapidly-cooling said lobster by spray irrigation to effect rapid temperature removal.

44. The method of claim 43 which comprises the final step of freezing said whole, cooked stuffed lobster.

45. The method of claim 44 which comprises blending, into said blended deep-shoulder meat fraction and female lobster roe, about 10 g to about 100 g of an edible starch per kilogram of said blended product to ensure freeze-thaw stability and performance of the cooked blend stuffing.

46. The method of claim 43, which comprises removing the claws, legs, and dorsal shell plate and visceral content of a lobster or lobsters, and subjecting the raw head-shell component of said lobster or other lobsters, to immersion in protease enzyme solution of between about 1% and about 5% (w/w) for a period of between about 2 minutes to about 8 minutes in a pH range of between about 5.0 to about 8.0 and a temperature range of between about 15° C. to about 45° C., to effect dislocation of the myotomal tissue from attachment of cartilaginous appendages and subsequent exposure of so-treated head-shell material to water at between about 80° C. to about 100° C. for between about 10 seconds and about 75 seconds, to effect termination of continuing protease enzyme activity and subsequent exposure of so-treated head-shell material to cold water in the temperature range of about 1° C. to about 10° C. for a period of between about 3 minutes to about 8 minutes, to effect heat removal from the head-shell and subsequent vacuum aspiration of the loosened myotomal tissue from said deep-shoulder section of said head-shell material by vacuum aspiration in the range of about 15 inches to about 25 inches of Hg.

47. The method of claim 43 which comprises subsequently blending deep-shoulder meat fraction with female Homaridae lobster roe which is manually-extracted from a gravid female Homaridae lobster or from female Homaridae lobsters, in proportions ranging from about 10 to about 50% (w/w) for the female lobster roe and correspondingly from about 90% to about 50% (w/w) for the deep-shoulder section meat.

48. The method of claim 43, which comprises introducing said stuffing blend into said anterior visceral cavity of a previously-eviscerated Homaridae lobster by oral incubation and subsequent vibration to effect removal of residual air, and thereby to achieve effective filling of said anterior visceral cavity effecting integuous contact between said stuffing blend and the contour of the inner shell surface and the region of abutment to the internal and anterior abdominal facet of tail meat, whereby a desirable appearance is achieved of the final cooked product, whereby said stuffing blend and the intact meat fraction of said tail section are continuous and have an attractive appearance to consumers.

49. The method of claim 43, comprising steam cooking said lobster meat-roe stuffing blend until an internal temperature of between about 75° C. to about 85° C. is obtained, and thereby to confer a mousse-like texture and a desirable pink coloration to said stuffing blend.

50. The method of claim 49, which comprises subsequently cooling said steam-cooked stuffed lobster by spray irrigation to a dorsal surface of said lobster, thereby to effect rapid-cooling of said lobster, to avoid overcooking and thereby to maintain high quality and integrity of the meat and stuffing fraction therein.

51. The method of claim 43, which comprises accompanying said vacuum aspiration of said anterior visceral cavity and said posterior intestinal tract by back-flushing with a dilute solution of lactic acid in a concentration range of about 5 mg/L to about 20 m/L (w/w), thereby to confer bacteriostatic property to the blanched raw eviscerated lobster product.

52. The method of claim 43, which comprises terminating the action of said protease enzyme solution by immersion of said so-treated raw head-shell component in hot water held at a temperature between about 80° C. to about 100° C. and for a period of between about 10 seconds to about 75 seconds, and subsequently transferring the so-heated head-shell component to conditions of cold-water immersion in a temperature range of between about 1° C. to about 10° C. for a duration of between about 1 minute to about 5 minutes prior to vacuum aspiration of said so-treated deep-shoulder section meat fraction under between about 15 inches to about 25 inches of Hg.

* * * * *